(12) United States Patent
Ponnuswamy et al.

(10) Patent No.: US 7,855,963 B2
(45) Date of Patent: Dec. 21, 2010

(54) CAPACITY ESTIMATION AND PROPORTIONAL SHARING OF VARYING CAPACITY CHANNELS

(75) Inventors: Subbu Ponnuswamy, Scotts Valley, CA (US); Partha Narasimhan, Santa Clara, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 897 days.

(21) Appl. No.: 11/644,545

(22) Filed: Dec. 21, 2006

(65) Prior Publication Data

US 2008/0151751 A1    Jun. 26, 2008

(51) Int. Cl.
    *H04L 1/00* (2006.01)

(52) U.S. Cl. .................. 370/232; 370/328; 370/444; 370/445; 455/435.2; 455/512; 455/166.2

(58) Field of Classification Search .......... 370/332, 370/328, 444, 445; 455/435.2, 512, 166.2
    See application file for complete search history.

(56) References Cited

U.S. PATENT DOCUMENTS

| | | | | |
|---|---|---|---|---|
| 5,737,313 A | * | 4/1998 | Kolarov et al. | 370/234 |
| 6,014,694 A | * | 1/2000 | Aharoni et al. | 709/219 |
| 6,064,678 A | * | 5/2000 | Sindhushayana et al. | 370/470 |
| 6,747,976 B1 | * | 6/2004 | Bensaou et al. | 370/395.4 |
| 6,850,540 B1 | * | 2/2005 | Peisa et al. | 370/468 |
| 6,987,738 B2 | * | 1/2006 | Subramanian et al. | 370/252 |
| 7,209,483 B2 | * | 4/2007 | Tran et al. | 370/394 |
| 7,336,634 B2 | * | 2/2008 | del Prado et al. | 370/332 |
| 2002/0057713 A1 | * | 5/2002 | Bagchi et al. | 370/468 |
| 2003/0007456 A1 | * | 1/2003 | Gupta et al. | 370/232 |
| 2003/0081627 A1 | * | 5/2003 | Bao et al. | 370/444 |
| 2003/0099285 A1 | * | 5/2003 | Graziano et al. | 375/220 |
| 2003/0125040 A1 | * | 7/2003 | Walton et al. | 455/454 |
| 2003/0210665 A1 | * | 11/2003 | Salmenkaita et al. | 370/330 |
| 2004/0003107 A1 | * | 1/2004 | Barham et al. | 709/235 |
| 2004/0190515 A1 | * | 9/2004 | Nogima et al. | 370/392 |
| 2004/0268351 A1 | * | 12/2004 | Mogensen et al. | 718/100 |
| 2005/0128977 A1 | * | 6/2005 | Kwak et al. | 370/329 |
| 2006/0187885 A1 | * | 8/2006 | Roy et al. | 370/332 |
| 2007/0081462 A1 | * | 4/2007 | Gefflaut et al. | 370/235 |
| 2008/0008135 A1 | * | 1/2008 | Saito et al. | 370/335 |

* cited by examiner

*Primary Examiner*—Rafael Pérez-Gutiérrez
*Assistant Examiner*—Nimesh Patel
(74) *Attorney, Agent, or Firm*—Blakely, Sokoloff, Taylor & Zafman LLP

(57) ABSTRACT

According to one embodiment of the invention, a method for controlling capacity of a wired or wireless network with varying bandwidth capacity is described. First, dynamic conditions associated with the data flow are measured. These dynamic conditions influence a bandwidth capacity for the data flow. Next, the capacity is estimated in order to adjust the data flow based on the estimated capacity per the measured dynamic conditions.

18 Claims, 5 Drawing Sheets

CAPACITY ESTIMATION AND PROPORTIONAL SHARING OF VARYING CAPACITY CHANNELS

FIELD

Embodiments of the invention relate to the field of communications, and in particular, to a network and method for estimating capacity of a varying capacity channel and proper allocation of the channel resources.

GENERAL BACKGROUND

Over the last decade or so, many commercial and governmental entities have installed communication networks in order to allow their employees access various network resources. To improve efficiency and to support mobility, many wireless access enhancements have been added to local, personal, and wide area networks. Based on these enhancements, Wireless Local Area Networks (WLANs), Personal Area Networks (PANs) and Wide Area Networks (WANs) have been and continue to be utilized by more and more users.

For instance, a WLAN supports communications between a number of wireless devices without any required line of sight between devices. In current network configurations, multiple Access Points (APs) are connected to a wired network, such as an Ethernet network for example, and each AP operates as a relay station by supporting communications between resources of the wired network and wireless stations (STAs). STAs are fixed or mobile wireless devices, where the mobile devices enable users to alter their physical locations, but still communicate over the network.

In accordance with many WLAN transmission schemes, including transmission schemes operating in accordance with any Institute of Electrical and Electronics Engineers (IEEE) 802.11 standard, each wireless device communicates with another device over a wireless channel. The resources for each wireless channel, that directly affect the Quality of Service (QoS), may be allocated according to any number of resource management mechanisms that can be broadly classified as shaping or policing. "Shaping" involves temporary storage or queuing of packets received in excess of a pre-negotiated or pre-configured limit for a particular wireless channel while "policing" involves dropping of packets exceeding the pre-negotiated or pre-configured limit for that wireless channel. A combination of policing and shaping may also be used.

One of the key differences between wireless and some wired networks is that the capacity of a wireless channel is dynamic and varies based on many factors. For instance, in a 100 Mbps (megabit per second) switched Ethernet network supporting ten (10) data transmissions flows, each flow may be allocated approximately 10 Mbps (less any overhead) since the (bandwidth) capacity for wired Ethernet medium is fairly static. For a wireless channel within a wireless medium, however, the available capacity from the wireless transmitter's perspective varies over time based on a variety of factors such as traffic between other devices on the same channel; interference on the wireless channel; number of retries required per transmission; the modulation and coding used for communication with a receiver; transmit-to-receive ratio; and media access delays and channel access overhead depending on the number of active devices if Carrier Sense Multiple Access/Collision Avoidance (CSMA/CA) is used.

Hence, it would be advantageous to develop a scheme that more accurately and dynamically estimates available capacity for one or more wireless channels or streams and takes into account implementation constraints that adversely influence capacity estimation and proportional sharing of capacity of the wireless channel(s) or stream(s) within a channel.

BRIEF DESCRIPTION OF THE DRAWINGS

The invention may best be understood by referring to the following description and accompanying drawings that are used to illustrate embodiments of the invention.

DETAILED DESCRIPTION

Figure 1:
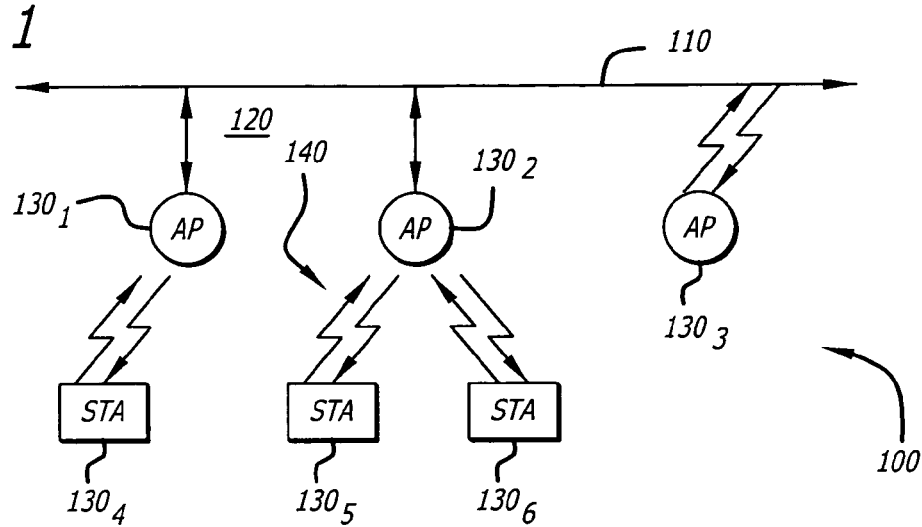
FIG. 1 is an exemplary embodiment of a wireless network in accordance with an embodiment of the invention.

Embodiments of the invention relate to a network, wireless device and method for estimating dynamic conditions of a wireless channel that may influence transmission capacity and for adjusting the wireless channel and resources based on the measured and observed conditions. For instance, a wireless device may be adapted to estimate capacity for one or more wireless channels based on queue backlog, channel busy statistics, observed traffic on the air, current transmit and receive rates, and retry rates for that channel. Based on these parameters, the wireless device may be controlled through a number of techniques in order to more effectively share the bandwidth for a wireless channel between multiple classes despite normal variations in channel conditions and capacity.

According to one embodiment of the invention, an estimation of current channel conditions and capacity may be performed in order to provide fair bandwidth distribution with support for bursting. This proportional sharing scheme uses substantially real-time feedback to adjust the parameters (e.g., "tokens") used in a traffic manager unit as described below.

According to another embodiment of the invention, the estimation of current channel conditions and capacity may be performed in order to redistribute excess bandwidth for the wireless channel. For instance, if additional queuing is provided, frames may be delayed to allow fair-bandwidth sharing of excess bandwidth. If no queuing is provided (e.g., policing), excess bandwidth distribution may be adjusted in order to achieve fairness over time.

According to yet another embodiment, the estimation of current channel conditions and capacity may be performed and utilized by a delay management scheme. This delay management scheme may drop frames upon determining that an expected delay of a frame exceeds a maximum delay specified for the class or flow, in addition to fair application of the bandwidth.

Certain details are set forth below in order to provide a thorough understanding of various embodiments of the invention, albeit the invention may be practiced through many embodiments other than those illustrated. Well-known logic and operations are not set forth in detail in order to avoid unnecessarily obscuring this description.

Herein, a "wireless device" may be broadly construed as any device that supports wireless communications. For instance, one type of wireless device may operate as an access point (AP) while another type of wireless device may operate as a wireless station (STA). Specific examples of wireless devices operating as APs or STAs include, but are not limited or restricted to servers, portable and laptop computers, voice-over-IP (VoIP) phones, personal digital assistants "PDAs", desktop computers, and the like. The wireless device includes one or more logic units (hardware and/or software). These logic units may estimate dynamic conditions of a wireless channel and/or adjust operations of the wireless device based on these conditions.

A "class" is network traffic that is uniquely identifiable. Examples of a class include any data flow uniquely identifiable by any number of identifiers including, but are not limited or restricted to a Media Access Control (MAC) address, an Internet Protocol (IP) address, a Layer 2 or Layer 3 (L2/L3) address, a virtual local area network (VLAN) identifier, a port number, a connection identifier, a service set identifier "SSID", a protocol and the like.

A "wireless link" may be broadly construed as communications between two wireless devices over one or more wireless channels. The wireless channels may be established and maintained in accordance with any of a number of wireless communication standards and protocols. As one example, the wireless communications may be in accordance with the High Performance Radio LAN (HiperLan) specification. As another example, the wireless communications may be in accordance with any communication standard such as WiFi (Institute of Electrical and Electronics Engineers "IEEE" 802.11-based standards), Wi-Max (IEEE 802.16) and the like.

The wireless communications between two wireless devices are generally controlled by one or more logic units (e.g., hardware and/or software). When implemented as software, logic units may be in the form of an application, an applet, an executable routine or even one or more executable instructions stored in a storage medium. The "storage medium" may include, but is not limited or restricted to a semiconductor memory device such as a volatile memory (e.g., random access memory, etc.) or a non-volatile memory (e.g., read-only memory, flash memory, a programmable electronic circuit, a hard drive, or the like.

A "frame" is information arranged in a selected format for transmission. Examples of different frame types may include, but are not limited or restricted to Data, Management, or Control frames.

I. General Architecture

Referring to FIG. 1, an exemplary embodiment of a network 100 is shown. In accordance with one embodiment of the invention, network 100 is a wireless local area network (WLAN) that comprises a backbone network 110 in communication with a wireless network 120. Alternatively, network 100 may be deployed as a personal area network (PAN) or a wide area network (WAN).

Network 100 comprises a plurality of wireless devices $130_1$-$130_N$ that are adapted to receive and/or transmit data. For this illustrative embodiment of the invention, wireless devices $130_1$-$130_N$ may include, but are not limited or restricted to access points (AP) $130_1$-$130_3$ and wireless stations (STAs) $130_4$-$130_6$, where AP $130_1$ provides STA $130_4$ access to resources on backbone network 110 while AP $130_2$ provides STAs $130_5$-$130_6$ access to these resources.

As shown, wireless communications are established through data flows including one or more wireless channels and/or streams within a channel between these devices. For clarity sake, these communicative data flows are generally referred to herein as "channels". For instance, a first channel 140 may be established between STA $130_5$ and AP $130_2$. Concurrently, over the same channel 140, communications are established with STA $130_6$.

Figure 2:
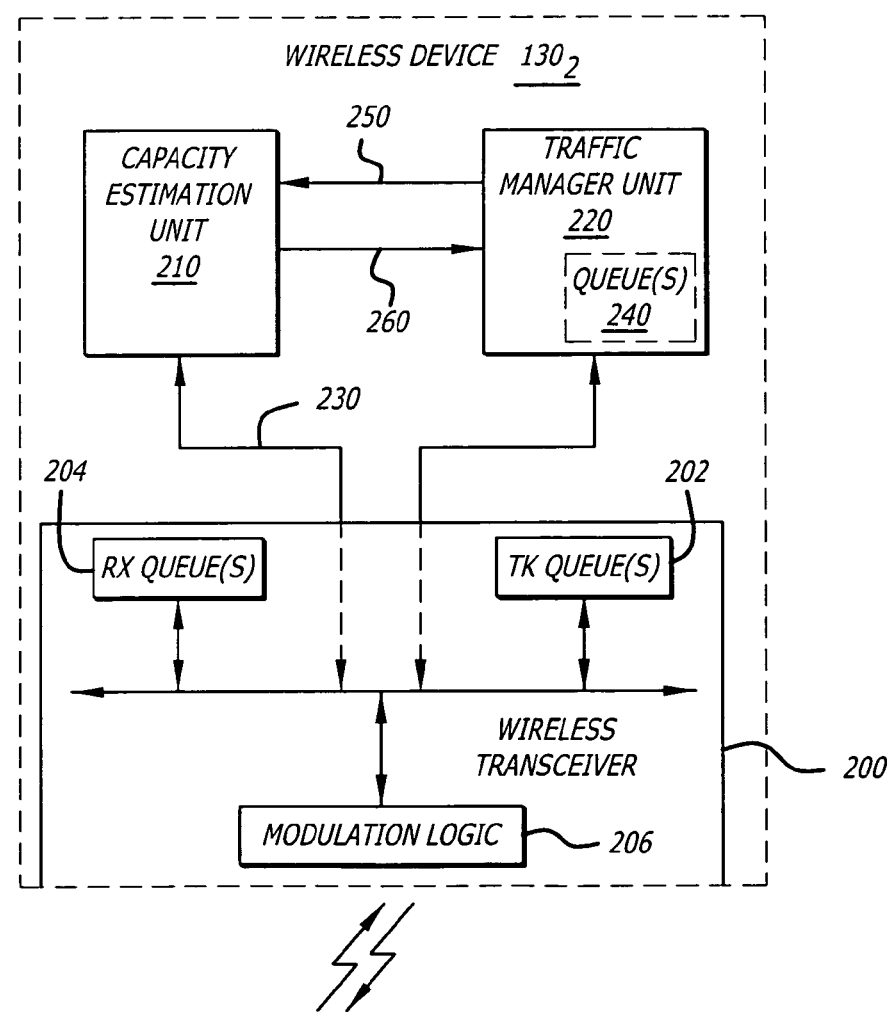
FIG. 2 is an exemplary embodiment of logic units implemented within the access point of the wireless network of FIG. 1.

Referring now to FIG. 2, an exemplary embodiment of logic units implemented within AP $130_2$ of FIG. 1 is shown. AP $130_2$ comprises a wireless (or wired) transceiver 200, a capacity estimation unit 210 and a traffic manager unit 220. In general, according to one embodiment of the invention, capacity estimation unit 210 is a logic unit adapted to receive information from wireless transceiver 200 and traffic manager unit 220 in order to estimate current channel conditions and capacity. The channel estimations are provided to traffic manager unit 220 that is responsible for controlling the transmissions of frames from wireless transceiver 200.

More specifically, wireless transceiver 200 is a logic unit adapted to transmit and receive frames from other wireless devices. Hence, wireless transceiver 200 comprises one or more transmit (TX) queues 202 for temporary storage of outgoing frames, one or more receive (RX) queues 204 for temporary storage of incoming frames and modulation logic 206 for controlling modulation and/or demodulation of such frames. Wireless transceiver 200 is in communication with capacity estimation unit 210 through a feedback link 230. As shown, feedback link 230 may be either a wireless interconnect or a wired interconnect such as one or more electrical wires, bus traces, cable and the like or a set of hardware (HW) registers in the memory. Feedback link 230 provides explicit and/or implicit feedback information to capacity estimation unit 210.

For instance, according to one embodiment of the invention, when in transmit mode, wireless transceiver 200 provides transmit (TX) status information concerning channel 140 to capacity estimation unit 210. The TX status information includes, but is not limited or restricted to one or more of the following: a number of retries for the transmission of a current frame over the channel, a rate of modulation (e.g., transmission rate), an indication whether the transmission was successful, and the like. The TX status information provides explicit information as identified above, but also provides implicit information. For instance, as an illustrative example, the rate of modulation, in essence, can be used to determine the amount of airtime necessary for the transmission.

Similarly, when in receive mode, wireless transceiver 200 is adapted to provide receive (RX) status information concerning wireless frames received by wireless transceiver 200. The RX status information may include, but is not limited or restricted to, whether the received frames are retry frames, the modulation rate(s) of the received frames, and the like.

Capacity estimation unit 210 receives the TX status information and the RX status information on a periodic or non-periodic basis in order to detect variations in channel conditions. These variations may require adjustment of the current transmission rates and/or adjustment of resources managed by traffic manager unit 220 (e.g., buffer allocation).

Traffic manager unit 220 is a logic unit adapted to receive incoming frames received by wireless transceiver 200. As an optional feature, when implemented with a regulator to perform "shaping" rate control, traffic manager unit 220 comprises one or more storage queues 240 to buffer outgoing frames to be transmitted from wireless transceiver 200. Storage queues 240 are adapted to store a plurality of frames.

According to one embodiment of the invention, the size of TX queues 202 may be obtained in both the number of frames stored as well as the number of bytes used or remaining in TX queues 202. As an optional feature, it is contemplated that a timestamp may be applied to each frame for delay management use as described below. The resource information, namely the number of frames and/or the number of bytes in TX queues 202, is provided to capacity estimation unit 210. For instance, this information may be provided via feedback link 230 or provided from traffic manager unit 220 via link 250. Of course, in order to better ensure fair allocation of resources such as bandwidth capacity, it is contemplated that the size of queues 202 may be dynamically reduced by "$H_1$" bytes ($H_1 \geq 0$) so that additional capacity is available when one class is unfairly treated with respect to resource allocation as described below.

Based on the TX status information, the RX status information and the resource information, capacity estimation unit 210 computes a capacity estimation, which is provided to traffic manager unit 220 via link 260. Based on capacity as well as the size of TX queues 202, the number of frames transmitted or dropped and other channel conditions provided by wireless transceiver 200, traffic manager unit 220 controls channel usage for each class.

Herein, capacity estimation unit 210 and traffic manager unit 220 are represented for illustration purposes as separate logic units. Of course, it is contemplated that capacity estimation unit 210 and traffic manager unit 220 may be implemented as a single logic unit supporting the above-described functionality.

Figure 3:
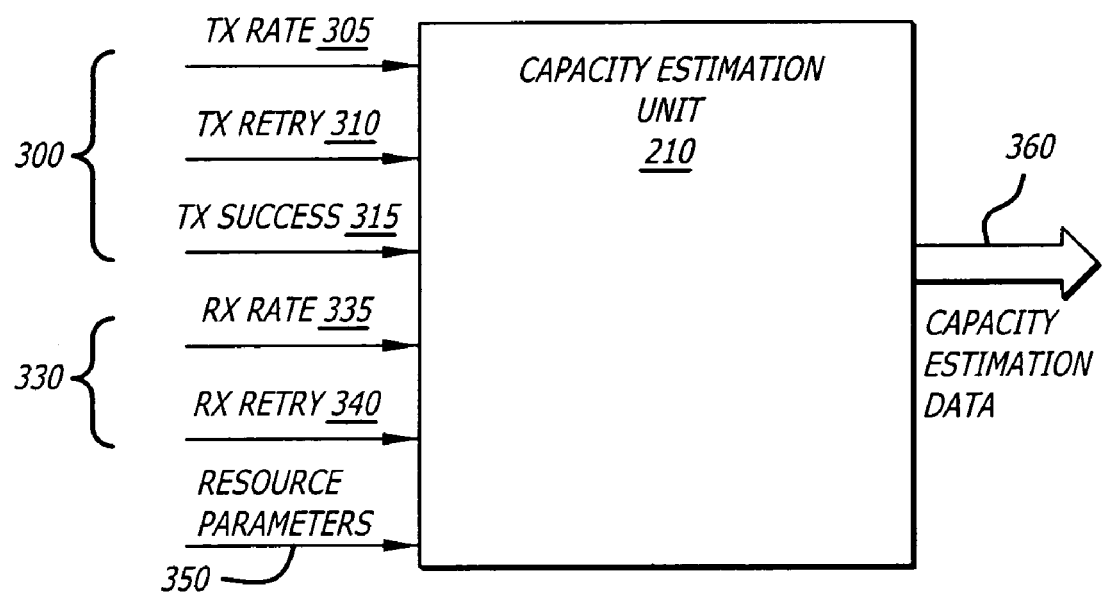
FIG. 3 is an exemplary embodiment of a capacity estimation unit of FIG. 2.
Figure 4:
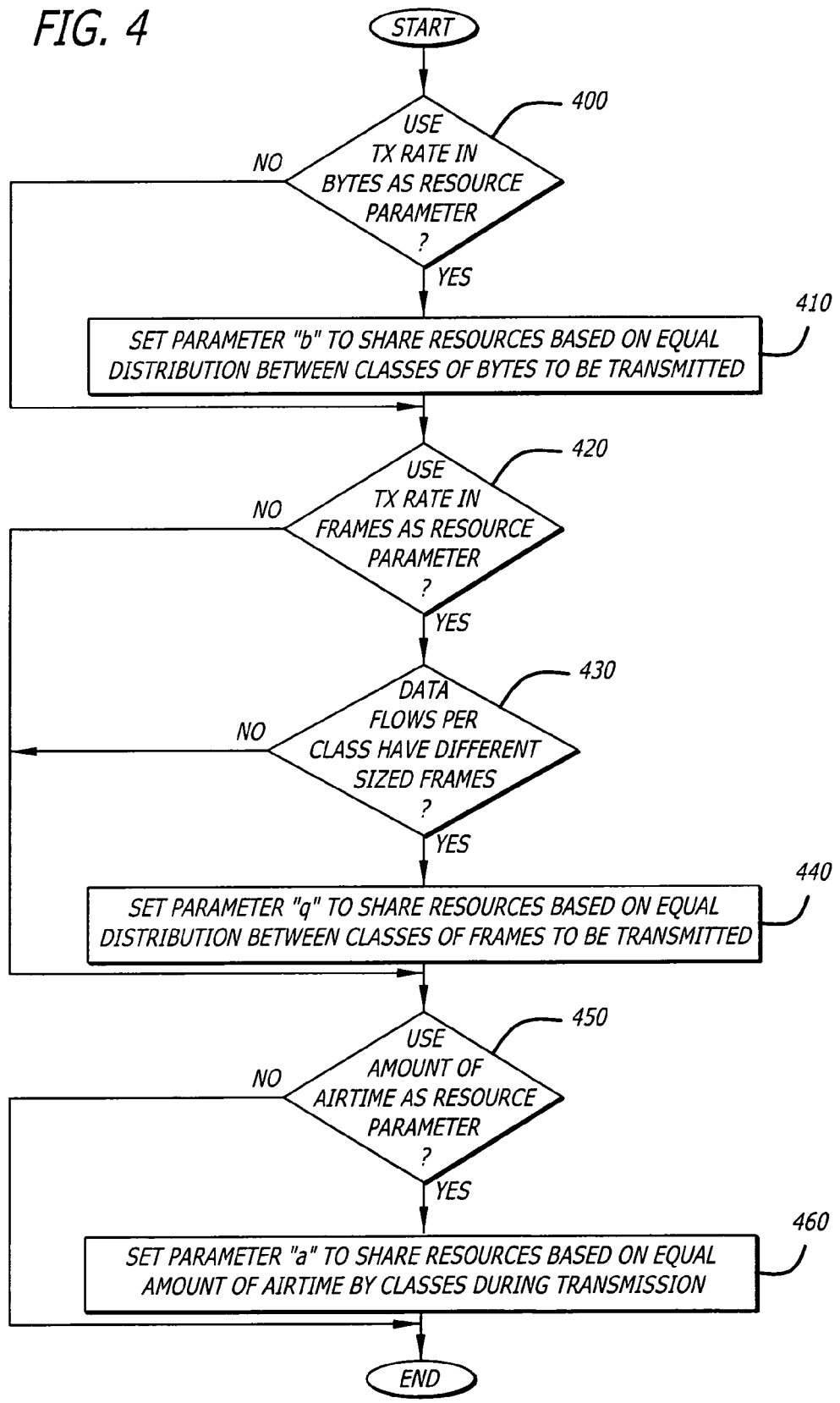
FIG. 4 is an exemplary flowchart illustrating the operations performed by the traffic manager unit of FIG. 2 to support proportional sharing of channel capacity.

Referring now to FIG. 3, an exemplary embodiment of capacity estimation unit 210 of FIG. 2 is shown. Herein, capacity estimation unit 210 receives TX status information 300 and/or RX status information 330 from wireless transceiver 200. As described above, TX status information 300 is directed to information concerning channel conditions during transmission such as (i) the modulation rate for a transmitted frame on a specific channel (TX rate 305), (ii) the number of retries necessary for the current frame being transmitted (TX retry 310), (iii) signaling whether the most recent frame transmission was successfully or not (TX success 315), and the like.

In addition, capacity estimation unit 210 receives RX status information 330, which is directed to information concerning channel conditions during reception. For instance, according to one embodiment of the invention, RX status information 330 comprises the modulation rate for a received frame (RX rate 335), whether the received frame was retried (RX retry 340), and the like. This information collectively provides feedback that is utilized in order to estimate channel capacity.

Besides the TX/RX status information 300 and 330, channel conditions may be ascertained through resources managed by traffic manager unit 220 of FIG. 2. For instance, regardless whether traffic manager unit 220 of FIG. 2 is adapted to perform shaping rate control or policing, resource parameters 350 such as queue size of TX queues 202 of FIG. 2 and/or byte size of the TX queues are available and can be provided to capacity estimation unit 210. Resource parameters 350 also provide implicit information as to the degree of usage of a channel. For instance, as the number of frames queued within the TX queues increase and the device is not able to transmit any frames or the device is transmitting at a lower modulation, it implicitly denotes that the channel is busy and/or the channel conditions are sub par. In contrast, as the storage level of the TX queues decreases or is empty due to the successful transmission of frames at optimal modulation rates, it implicitly denotes that the channel is not busy and is able to support a higher level of traffic.

Alternatively, when traffic manager unit 220 of FIG. 2 is adapted to perform shaping rate control, it is contemplated that the resource parameters 350 may further include queue size of storage queues 240 in frames and/or bytes. The additional queuing may be used to shape the outgoing traffic, by delaying some frames and scheduling these frames only when certain conditions are met.

After receipt of TX/RX status information 300, 330 and resource parameters 350, capacity estimation unit 210 provides capacity estimation data 360 to traffic manager unit 220 via link 260 of FIG. 2. Capacity estimation data 360 is utilized by traffic manager unit 220 in order to make shaping and/or policing decisions. With respect to the shaping decisions, traffic manager unit 220 determines which frame is to be transmitted and the ordering within queues 240. For policing decisions, traffic manager unit 220 determines whether to drop or forward frames in accordance with capacity estimation data 360. In accordance with one embodiment of the invention, capacity estimation data 360 may be derived in accordance with any of a number of techniques as described below.

It is contemplated that the embodiments of the invention are described for wireless networks that have varying (dynamic) capacity. However, it is contemplated that the invention is further applicable to wired networks that have varying capacity. For instance, it is noted that any network supporting multiple modulation schemes may constitute a varying-capacity network. As an example, a cable modem in accordance with Digital Over Cable Service Interface Specification (DOCSIS) supports multiple modulation schemes, and thus, support different transmission rates (and bandwidth capacity).

II. Proportional Sharing with Bursting

According to one embodiment of the invention, the available capacity and cost of a frame to be transmitted are estimated by traffic manager unit 220 using a weighted formula set forth in equation (1) below. Each class may use different values for "B" (queue size) and "A" (airtime) to manage the available capacity.

$$R = (q \times Q) + (b \times B) + (a \times A), \qquad (1)$$

where
- "Q" is the queue size of queue(s) (e.g., TX queues 202 within wireless transceiver 200 of FIG. 2) in number of frames,
- "B" is the queue size of the queue(s) (e.g., TX queues 202 within wireless transceiver 200 of FIG. 2) in number of bytes, and
- "A" is the queue size of the queue(s) (e.g., TX queues 202 within wireless transceiver 200 of FIG. 2) in microseconds of airtime, which can be derived from the queue size (in bytes) along with the transmission rate (and optionally retry frequency) as provided by the wireless transceiver.

According to one embodiment of the invention, normalized values should be used for Q, B and A. The weighting parameters "a", "b" and "q" define the corresponding weighting for each of these resource parameters, where $0 \leq a \leq 1$, $0 \leq b \leq 1$ and $0 \leq q \leq 1$ and $a+b+q=1$. This weighted formula can be used to share the resources purely based on the number of frames (when a=b=0), based on the number of bytes (when a=q=0), based on the airtime (when b=q=0), or a combination of two or more of these resource parameters. Such sharing is designed to achieve a desired level of fairness in the use of resources between classes, where such fairness may involve an automatic, equal distribution of resources or a disproportionate distribution of resources based on the values selected by a system administrator.

As an illustrative embodiment of the invention, with respect usage of transmitter of the wireless transceiver, the sharing of such resources may be based on one or more of the following resource parameters: (1) a desired transmission rate in bytes (or bits) per second, (2) a desired transmission rate in frames per second, and (3) the amount of airtime needed per transmission. These resource parameters may be used to provide different granularities of fairness in the sharing of resources.

For instance, a certain level of fairness may be achieved between two data flows, which constitute different classes on the wireless device, by sharing resources based on an equal number of bytes transmitted (adjusting "b×B" to be equal for each class) as shown in blocks 400 and 410. However, in the event that the size of the frames transmitted from these two data flows (e.g., first and second applications) differs, resource sharing simply through an adjustment of the number of bytes, such as the number of megabits per second "Mbps" transmitted, may not provide a level of fairness desired, due to the fixed overhead associated with every frame transmission.

In lieu of or in addition to using the number of bytes resource parameter, the number of frames used for transmissions from the wireless device for each application may be evaluated (blocks 420 and 430). The "q" parameter may be set to ensure that the number of frames transmitted by each application (q×Q) provides a desired level of fairness (block 440). This level of fairness may ensure that the different amounts of overhead for various frames are taken into account.

Where multiple resource parameters are used to achieve a desired level of fairness, the estimated capacity of cost per frame (R), and perhaps not the resource parameter "q×Q," may be set to predetermined values or to predetermined ratios between "R" values for different application classes.

Another granularity of fairness may involve the amount of airtime (air resources) allocated per application (block 450). For instance, if the modulation rate for the first application is 1 Mbps while the modulation rate for the second application is 54 Mbps, the second application is unfairly treated because it is only allocated $1/54^{th}$ of the amount of airtime as the first application. Hence, the "a" weighting parameter may be set to ensure that the amount of allocated airtime is equal or, more importantly, where multiple resource parameters are used to achieve a desired level of fairness, the estimated capacity of cost per frame (R) is equal for each application or is disproportionate based on a desired ratio (block 460).

As indicated above, the estimated frame size (average, minimum or maximum) and airtime based on a modulation (average, minimum or maximum) may be used to compute the capacity estimation data 360 of FIG. 3. The used capacity can be accurately calculated based on the transmitted frames, bytes and their transmission rates. Available capacity can be estimated based on the average values currently in use, historical averages or other configured values for each class.

Figure 5:
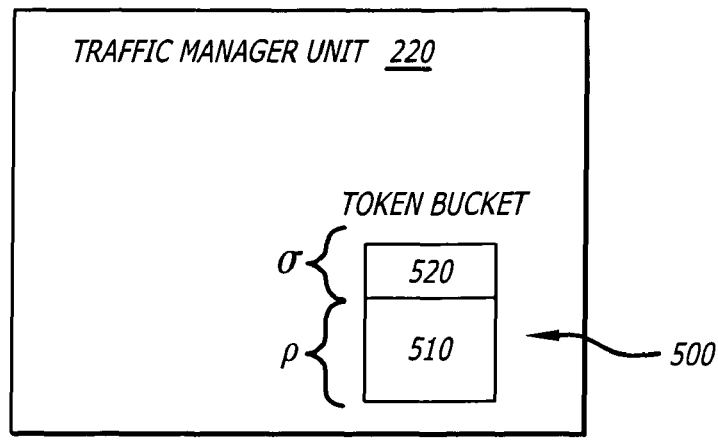
FIG. 5 is an exemplary embodiment of proportional sharing of channel capacity separated on a per-class or per-flow basis, where the share is specified as a set of parameters such as a token bucket.

Referring to FIG. 5, based on the proportional sharing computations described above, traffic manager unit 220 uses a set of traffic parameters such as token buckets to characterize and manage the proportional sharing of resources. Herein, a token bucket 500 is assigned to each class and is used to ensure conformity with traffic configurations for the wireless device.

As shown, according to one embodiment of the invention, the depth of each token bucket (e.g., token bucket 500) is initialized as ρ+σ, where "ρ" 510 is the proportional share of this class (equivalent to the average rate) and "σ" 520 is the burst size allowed within a time interval $t_1$. The interval "$t_1$" is the average time taken to fully drain TX queues 202 of FIG. 2.

Of course, it is contemplated that "ρ" and "σ" may be maintained as two separate token buckets to allow efficient distribution of excess capacity, where "σ" is a common token bucket shared by all classes.

According to one embodiment of the invention, "ρ" is a dynamically adjustable proportional share of resources (e.g., TX capacity of wireless transceiver 200 of FIG. 2) and "σ" is a dynamically adjustable burst size, both of which are computed as shown in equation (2):

$$\rho = (r_i \times R) \text{ and } \sigma = ((1 - r_i) \times R), \qquad (2)$$

where $0 \le r_i \le 1$, $$\sum_{i=1}^{c} r_i = 1, \text{ and}$$

Figure 6:
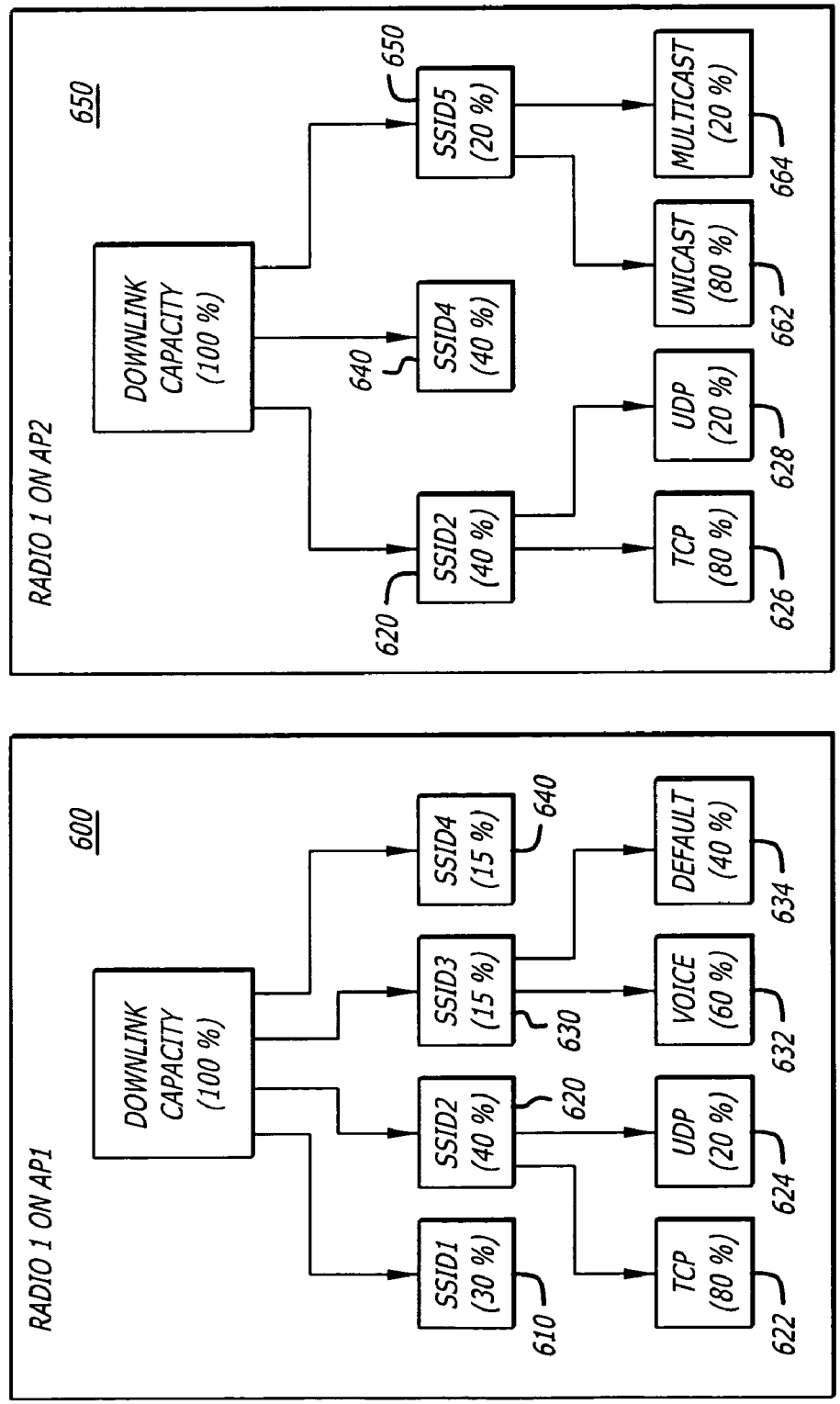
FIG. 6 is an illustrative embodiment of the allocation of channel capacity based on a selected class or flow.

"c" is the total number of classes in that level such as four (c = 4) in the proportional sharing exemplary illustration shown in Figure 6.

The appropriate number of tokens (based on the cost as described above) is deducted from token bucket 500 whenever a frame arrives and tokens are added back as soon as (i) a frame is successfully transmitted and removed from TX queues 202 of FIG. 2 and (ii) the number of tokens is less than ρ. A number of tokens equivalent to the burst size σ are additionally available once every $t_1$ interval to accommodate bursts.

As a further optional feature, the size of TX queues 202 for the purposes of capacity estimation may be reduced by $H_1$ as described above, for policing implementations. Thus, size of the queue(s) for capacity estimation is according to equation (3):

$$Q = Q\text{max} - H_1, \qquad (3)$$

"Qmax"=maximum queue size; and where

"$H_1$"=a dynamically adjustable value that reserves space in the queue(s) only to accommodate frames from classes to meet proportional share requirements and not for use with burst size or excess bandwidth.

Based on the capacity estimation data, the traffic manager unit performs operations to distribute available and excess bandwidth as well as enforcement of maximum delays per frame on a per-class basis in order to provide bounded delays despite varying channel conditions. These methods of operations are described below.

Referring now to FIG. 6, an illustrative embodiment of the allocation of channel capacity based on a selected class is shown. Herein, this allocation is initially conducted level-by-level basis. According to this embodiment of the invention, the bandwidth sharing is initially classified on a per-SSID basis, and further allocations may be classified on a "per-protocol" and "per-application" basis.

As shown, with respect to communications by a first AP (AP1) 600, at a first level, the entire transmission (downlink) capacity is allocated to four different wireless sub-networks each having a unique service-set identifier, namely SSID1 610, SSID2 620, SSID3 630 and SSID4 640. These SSIDs 610, 620, 630 and 640 are allocated a percentage of the total capacity for the channel, namely SSID1 610 at 30 percent (30%), SSID2 620 at 40%, SSID3 630 at 15% and SSID4 640 at 15%, respectively. The cumulative percentage for bandwidth sharing for these SSIDs (class) is 100% and may be managed in an adaptive fashion based on the capacity estimation data returned by the capacity estimation unit of FIG. 2. Any secondary classes for a particular SSID will also have a cumulative percentage equal to 100%.

As an illustrative example, SSID2 620 is allocated 40% of the bandwidth for a particular channel. Presuming a ten (10) megabits per second (Mbps) bandwidth for the channel, SSID2 620 is allocated 4 Mbps. For this allocated bandwidth, eighty percent (80%) or 3.2 Mbps is allocated for traffic in accordance with Transmission Control Protocol (TCP) 622 while twenty percent (20%) or 0.8 Mbps is allocated for traffic in accordance with User Datagram Protocol (UDP) 624.

Similarly, SSID3 630 is allocated 15% of the bandwidth for the particular channel or 1.5 Mbps. According to this allocation, sixty percent (60%) or 0.9 Mbps is allocated for voice traffic (first sub-class) 632 while forty percent (40%) or 0.6 Mbps is allocated for a second sub-class 634 such as data traffic.

The number of streams defined by one AP may fully or partially overlap with stream transmissions of another AP. For example, as shown in FIG. 6, the transmissions of a second AP (AP2) 650 are also directed to SSID5 660 as well as SSID2 620 and SSID4 640. Similarly, SSID2 620 features capacity sharing on a "per-protocol" basis. Presuming 10 Mbps bandwidth for the channel, SSID2 620 is allocated 4 Mbps with eighty percent (80%) or 3.2 Mbps allocated for TCP traffic 626 while twenty percent (20%) or 0.8 Mbps is allocated for UDP 628. SSID5 660 provides further capacity sharing based on a "per transmission type" basis with eighty percent (80%) or 1.6 Mbps of the assigned capacity allocated for unicast traffic 662 while twenty percent (20%) or 0.4 Mbps of the assigned capacity is allocated for multicast traffic 664.

III. Fair Distribution of Excess Bandwidth

Figure 7:
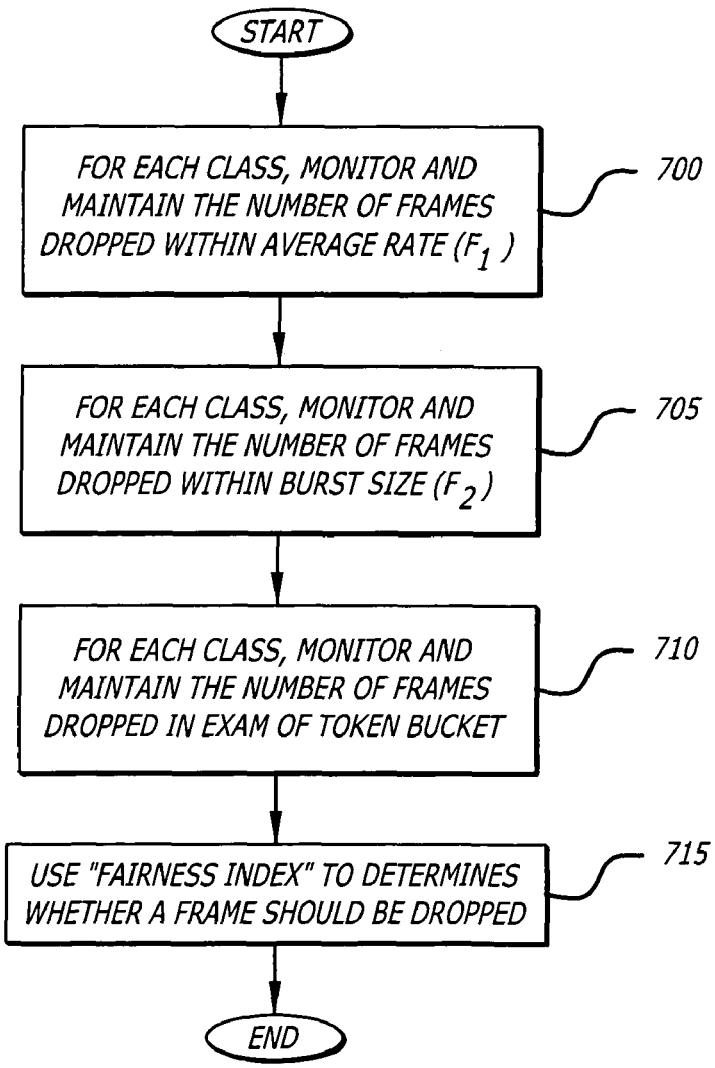
FIG. 7 is an exemplary flowchart illustrating the operations performed by the traffic manager unit of FIG. 2 to support fair distribution of excess capacity for a wireless channel.

Besides functionality of controlling the sharing of resources such as proportional sharing of existing bandwidth described above, each class may be designated whether or not it is eligible for fair sharing of the excess bandwidth. In order to accomplish such control, as shown in FIG. 7, the traffic manager unit 220 of FIG. 2 keeps track of the following information for each class for every time window $t_1$, where the length of the window may be chosen (few milliseconds, few seconds, etc), depending on the desired level of fairness and implementation complexity.

$f_1$=# frames transmitted/dropped that were within the average rate considered to be a fill rate such as "ρ" tokens (e.g., still had tokens but no buffers, when dropped);

$f_2$=# frames transmitted/dropped in excess of its average rate but within the burst size such as "ρ+σ" tokens; and $f_3$=# frames transmitted/dropped in excess of the token bucket (excess bandwidth sharing >"ρ+σ" tokens)

More specifically, for each of those transmitted/dropped counts, traffic manager unit 220 of FIG. 2 keeps track of each ratio ($f_i$) of the dropped to the total frames, where $0 \leq f_i \leq 1$ (blocks 700-710). Therefore, when excess bandwidth is available and a flow has already run out of its allocated tokens, the traffic manager unit uses the Fairness Index to determine if the newly arrived frame should be dropped or forwarded (block 715).

The decision for distribution of excess bandwidth may be based on how fairly other classes were treated compared to this class, during the last $n \cdot t_2$ intervals, where the value "n" may vary depending on the class and other dynamic conditions.

A Fairness Index is calculated for every class, which is a weighted sum of all the three ratios as set forth in equation (4):

$$F = w1 \cdot f_1 + w2 \cdot f_2 + w3 \cdot f_3, \qquad (4)$$

where $$w1 \geq w2 \geq w3 \text{ and } w1 + w2 + w3 = 1.$$

When the Fairness Index for a first class is computed to be a higher index value than a second class, this index identifies that the second class was treated less "fair" than the first class over a particular time interval. Hence, according to this illustrative example, classes with higher Fairness Indexes, such as the first class, will have a lowest probability of frame forwarding than the second class to compensate for any frames dropped during the particular time interval.

IV. Delay Management

The above-identified operations by the Traffic Manager unit control the sharing of bandwidth capacity and the distribution of excess bandwidth capacity. These functions are not directed to the control of delay, as frames may have unbounded delays depending on channel conditions (even if the queue(s) never get full).

A delay bound (threshold) may be specified for each class. If a delay bound is specified, however, frames are dropped if an expected delay is more than the predetermined delay bound. The expected delay may be calculated using the timestamps described above. The expected delay is calculated based on the current drain rate over a time interval $t_3$ (an average inter-frame delay can be derived from this value), average retry rate for each class and the total airtime required to transmit the frames currently queued. For traffic shaping schemes, the time spent in the queues of traffic manager unit 220 of FIG. 2 is also taken into account while estimating the delay.

A frame dropped due to this delay bound threshold is counted just like other frames drops for the purpose of fairness (i.e., depending on whether this frame conforms to the configured rate, burst or excess bandwidth share)

The delay is still somewhat non-deterministic for frames that are already queued in the transmit (TX) queues, since once queued, frames may not be dropped. Only delay of newly arriving frames or frames queued in the traffic manager unit can be controlled using this method.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A method comprising:
   measuring dynamic conditions of a data flow, the dynamic conditions influencing a capacity for the data flow;
   estimating the capacity of the data flow based on the measured dynamic conditions; and controlling an output of frames based on the estimated capacity for a first class and a second class for the data flow in accordance with a Fairness Index, the Fairness Index being a weighted sum of ratios each ratio being associated with a number of frames dropped within or in excess of a different transmission rate, the first class having a lower probability of frame forwarding during distribution of excess capacity if the first class has a higher Fairness Index value than the second class.

2. The method of claim 1, wherein the data flow is a wireless channel.

3. The method of claim 2, wherein the measuring of the dynamic conditions includes measuring a current transmit rate for the wireless channel.

4. The method of claim 2, wherein the measuring of the dynamic conditions includes measuring a number of retries to transmit information over the wireless channel.

5. The method of claim 2, wherein the measuring of the dynamic conditions includes measuring an amount of data stored in output queues of a wireless device.

6. The method of claim 2, wherein the measuring of the dynamic conditions includes receiving and processing transmit status information, the transmit status information includes at least one of (i) a number of retries for a transmission of a current frame over the wireless channel, (ii) a rate of modulation, and (iii) an indication whether the transmission was successful.

7. The method of claim 2, wherein the measuring of the dynamic conditions includes receiving and processing receive status information, the receive status information includes at least one of (i) a number of frames that are retry frames and (ii) a rate of modulation.

8. The method of claim 1 further comprising:
producing capacity estimation data based on an analysis of the measured dynamic conditions to manage the data flow.

9. The method of claim 8 further comprising:
adjusting of the data flow by proportionally sharing the capacity of the data flow between multiple classes including the first class and the second class.

10. The method of claim 9, wherein the adjusting of the data flow by proportionally sharing the capacity of the data flow between multiple classes includes setting one or more of the following resource parameters for each of the multiple class equal: (1) a desired transmission rate in bytes or bits per second, (2) a desired transmission rate in frames per second, and (3) an amount of airtime used per transmission.

11. A network device comprising:
a transceiver;
a capacity estimation unit coupled to the transceiver, the capacity estimation unit to receive information from the transceiver and estimate current capacity; and
a traffic manager unit coupled to the capacity estimation unit and the transceiver, the traffic manager unit to control an output of frames from the transceiver based on the estimated capacity provided by the capacity estimation unit, wherein a logic unit within the traffic manager unit further controls transmissions from the transceiver for a first class and a second class in accordance with a Fairness Index, the Fairness Index being a weighted sum of ratios each associated with a number of frames dropped within or in excess of a different transmission rate, the first class having a lower probability of frame forwarding during distribution of excess capacity if the first class has a higher Fairness Index value than the second class.

12. The network device of claim 11, wherein the transceiver is a wireless transceiver that provides the information that includes transmit status information, the transmit status information includes at least one of (i) a number of retries for a transmission of a current frame over a channel, (ii) a rate of modulation, and (iii) an indication whether the transmission was successful.

13. The network device of claim 11, wherein the transceiver is a wireless transceiver that provides the information that includes receive status information, the receive status information includes at least one of (i) a number of frames that are retry frames and (ii) a rate of modulation.

14. The network device of claim 11, wherein the logic unit within the traffic manager unit to further manage queues within the traffic manager unit based on at least the estimated capacity provided by the capacity estimation unit.

15. The network device of claim 11, wherein the logic unit within the traffic manager unit to further control transmissions from the transceiver in accordance with a desired level of fairness in use of resources between classes.

16. The network device of claim 15, wherein the logic unit within the traffic manager unit to control fairness of transmissions from the transceiver based on one or more of the following resource parameters: (1) a desired transmission rate in bytes or bits per second, (2) the desired transmission rate in frames per second, and (3) an amount of airtime needed per transmission.

17. The network device of claim 11 being implemented within a network with varying capacity of channels supporting the transmission of the frames from transceiver.

18. The network device of claim 17, wherein the transceiver is coupled to a wired interconnect for transmission of the frames.

* * * * *